United States Patent
Nagaraj

(10) Patent No.: US 10,133,488 B2
(45) Date of Patent: Nov. 20, 2018

(54) APPARATUS AND METHOD FOR CACHE PROVISIONING, CONFIGURATION FOR OPTIMAL APPLICATION PERFORMANCE

(71) Applicant: CacheBox Inc., San Carlos, CA (US)

(72) Inventor: Murali Nagaraj, Pune (IN)

(73) Assignee: PrimaryIO, Inc., San Carlos, CA (US)

( * ) Notice: Subject to any disclaimer, the term of this patent is extended or adjusted under 35 U.S.C. 154(b) by 0 days.

(21) Appl. No.: 14/660,546

(22) Filed: Mar. 17, 2015

(65) Prior Publication Data
US 2015/0261438 A1 Sep. 17, 2015

Related U.S. Application Data

(60) Provisional application No. 61/954,007, filed on Mar. 17, 2014.

(51) Int. Cl.
*G06F 3/06* (2006.01)
(52) U.S. Cl.
CPC ............ *G06F 3/061* (2013.01); *G06F 3/0655* (2013.01); *G06F 3/0689* (2013.01)
(58) Field of Classification Search
None
See application file for complete search history.

(56) References Cited

U.S. PATENT DOCUMENTS

| | | | |
|---|---|---|---|
| 5,657,445 A | 8/1997 | Pearce | |
| 5,732,239 A | 3/1998 | Tobagi et al. | |
| 5,742,792 A | 4/1998 | Yanai et al. | |
| 5,854,941 A | 12/1998 | Ballard et al. | |
| 6,754,696 B1 | 6/2004 | Kamath et al. | |
| 7,451,348 B2 * | 11/2008 | Pecone | G06F 1/305 714/14 |
| 7,487,391 B2 * | 2/2009 | Pecone | G06F 1/28 714/14 |
| 7,542,999 B2 | 6/2009 | Kamath et al. | |
| 7,661,002 B2 * | 2/2010 | Pecone | G06F 1/305 713/300 |
| 7,895,398 B2 * | 2/2011 | Shet | G06F 12/0871 711/129 |
| 7,930,270 B2 * | 4/2011 | Tsang | G06F 17/30165 707/610 |

(Continued)

OTHER PUBLICATIONS

Dictionary.com, "Transient", Oct. 18, 2011, pp. 1-3; https://web.archive.org/web/20111018105151/http://thesaurus.com/browse/transient.*

(Continued)

*Primary Examiner* — Christopher D Birkhimer

(57) ABSTRACT

In an embodiment of the invention, a method comprises: recording application-level heuristics and IO-level (input/output-level) heuristics; correlating and analyzing the application-level heuristics and IO-level heuristics; and based on an analysis and correlation of the application-level heuristics and IO-level heuristics, generating a policy for achieving optimal application performance. In another embodiment of the invention, an apparatus comprises: a system configured to record application-level heuristics and IO-level heuristics, to correlate and analyze the application-level heuristics and IO-level heuristics, and based on an analysis and correlation of the application-level heuristics and IO-level heuristics, to generate a policy for achieving optimal application performance.

20 Claims, 2 Drawing Sheets

(56) References Cited

U.S. PATENT DOCUMENTS

| | | | | |
|---|---|---|---|---|
| 7,930,481 | B1* | 4/2011 | Nagler | G06F 12/0804 710/18 |
| 7,945,945 | B2* | 5/2011 | Graham | H04L 29/12009 713/151 |
| 7,949,834 | B2* | 5/2011 | Morrow | G06F 12/121 711/134 |
| 8,171,219 | B2* | 5/2012 | Trika | G06F 12/0862 711/112 |
| 8,291,166 | B2* | 10/2012 | Cornwell | G06F 12/0888 711/103 |
| 8,370,850 | B2* | 2/2013 | Nochimowski | G06F 3/0607 711/123 |
| 8,402,049 | B2* | 3/2013 | Miyajima | G06F 17/30902 707/661 |
| 8,443,134 | B2* | 5/2013 | Flynn | G06F 9/52 711/103 |
| 8,458,282 | B2* | 6/2013 | Chen | H04L 49/90 709/213 |
| 8,549,222 | B1 | 10/2013 | Kleiman et al. | |
| 8,561,148 | B2* | 10/2013 | Hayton | G06F 21/6218 726/4 |
| 8,583,874 | B2* | 11/2013 | Dubrovin | G06F 12/0862 711/134 |
| 8,606,998 | B2* | 12/2013 | Zulauf | G06F 12/0862 711/125 |
| 8,607,001 | B2* | 12/2013 | Zhao | H04L 67/2852 711/133 |
| 8,689,265 | B2 | 4/2014 | Lockett et al. | |
| 8,904,117 | B1 | 12/2014 | Kalekar | G06F 12/0804 711/119 |
| 9,152,648 | B2* | 10/2015 | Regni | G06F 17/30221 |
| 9,251,086 | B2 | 2/2016 | Peterson et al. | |
| 2001/0007148 | A1 | 7/2001 | Murata et al. | |
| 2003/0056060 | A1 | 3/2003 | Hertz et al. | |
| 2004/0128459 | A1 | 7/2004 | Chanda et al. | |
| 2005/0060316 | A1 | 3/2005 | Kamath et al. | |
| 2005/0289312 | A1 | 12/2005 | Ghosal et al. | |
| 2007/0028053 | A1* | 2/2007 | Shet | G06F 12/0871 711/129 |
| 2007/0033431 | A1* | 2/2007 | Pecone | G06F 1/28 714/6.12 |
| 2007/0033432 | A1* | 2/2007 | Pecone | G06F 1/305 714/6.12 |
| 2007/0033433 | A1* | 2/2007 | Pecone | G06F 1/305 714/6.13 |
| 2008/0288947 | A1 | 11/2008 | Gokhale et al. | |
| 2009/0307700 | A1* | 12/2009 | Cazorla Almeida | G06F 9/4887 718/103 |
| 2009/0327613 | A1* | 12/2009 | Nutter | G06F 12/0875 711/141 |
| 2010/0153617 | A1* | 6/2010 | Miroshnichenko | G06F 3/061 711/6 |
| 2010/0281216 | A1* | 11/2010 | Patel | G06F 12/121 711/118 |
| 2010/0325345 | A1* | 12/2010 | Ohno | G06F 11/108 711/103 |
| 2011/0047437 | A1* | 2/2011 | Flynn | G06F 9/52 714/758 |
| 2011/0138131 | A1* | 6/2011 | Regni | G06F 17/30221 711/133 |
| 2011/0276765 | A1* | 11/2011 | Dawkins | G06F 12/0897 711/145 |
| 2011/0295874 | A1* | 12/2011 | Miyajima | G06F 17/30902 707/769 |
| 2011/0320436 | A1* | 12/2011 | Hokanson | G06F 3/061 707/719 |
| 2012/0066435 | A1 | 3/2012 | Colgrove et al. | |
| 2012/0131038 | A1 | 5/2012 | Aronovich | G06F 11/1435 707/769 |
| 2012/0151149 | A1* | 6/2012 | Dubrovin | G06F 12/126 711/133 |
| 2012/0192073 | A1 | 7/2012 | Vallone et al. | |
| 2012/0198032 | A1* | 8/2012 | Fitzgerald | H04W 4/00 709/219 |
| 2012/0239857 | A1 | 9/2012 | Jibbe et al. | |
| 2012/0278842 | A1 | 11/2012 | Look et al. | |
| 2012/0311674 | A1* | 12/2012 | Hockings | G06F 21/6218 726/4 |
| 2013/0013861 | A1* | 1/2013 | Cornwell | G06F 12/0888 711/118 |
| 2013/0041982 | A1* | 2/2013 | Shi | H04L 65/4084 709/217 |
| 2013/0086324 | A1* | 4/2013 | Soundararajan | G06F 12/0813 711/122 |
| 2013/0086552 | A1 | 4/2013 | Whitney et al. | |
| 2013/0159341 | A1* | 6/2013 | Miyajima | G06F 17/30902 707/769 |
| 2013/0166724 | A1* | 6/2013 | Bairavasundaram | G06F 9/5016 709/224 |
| 2013/0185502 | A1 | 7/2013 | Ash et al. | |
| 2013/0185504 | A1 | 7/2013 | Ash et al. | |
| 2013/0205092 | A1* | 8/2013 | Roy | G06F 12/084 711/130 |
| 2013/0205097 | A1* | 8/2013 | Flynn | G06F 12/0246 711/142 |
| 2013/0219078 | A1 | 8/2013 | Padmanabhan et al. | |
| 2013/0239158 | A1 | 9/2013 | Chan et al. | |
| 2013/0254488 | A1* | 9/2013 | Kaxiras | G06F 12/0815 711/130 |
| 2013/0318224 | A1* | 11/2013 | Cleary | H04L 41/024 709/223 |
| 2013/0326583 | A1 | 12/2013 | Freihold et al. | |
| 2014/0019688 | A1 | 1/2014 | Ghodsnia et al. | |
| 2014/0059292 | A1 | 2/2014 | Phelan | G06F 12/0866 711/113 |
| 2014/0281121 | A1 | 9/2014 | Karamcheti et al. | |
| 2014/0359229 | A1 | 12/2014 | Cota-Robles | G06F 9/455 711/143 |
| 2014/0379965 | A1 | 12/2014 | Gole et al. | |
| 2015/0074448 | A1 | 3/2015 | Ageishi | G06F 11/2007 714/4.11 |
| 2015/0081979 | A1 | 3/2015 | Banta | G06F 12/0804 711/135 |

OTHER PUBLICATIONS

Office Action for U.S. Appl. No. 14/659,773, dated Jun. 30, 2016, having named inventor Murali Nagaraj.

Office Action for U.S. Appl. No. 14/660,935, dated Nov. 15, 2016, having named inventors Anand Mitra, Dilip Ranade et al.

Office Action for U.S. Appl. No. 14/660,931, dated Apr. 22, 2016, having named inventors Sumit Kumar & Sumit Kapoor.

Webopedia, "Disk Cache", Oct. 1, 2002, pp. 1-2, https://web.archive.org/web/20021001223846/http://www.webopedia.com/TERM/D/disk_cache.html.

Morris Kaashoek, "Chapter 6", Sep. 23, 2010, pp. 1-5, https://web.archive.org/web/20121222071910/http://www.cs.columbia.edu/~junfeng/11sp-w4118/lectures/disk.pdf.

The Linux Documentation Project, "7.6 The Buffer Cache", pp. 1-2, https://web.archive.org/web/20031223081354/http://www.tldp.org/LDP/sag/html/buffer-cache.html.

Office Action for U.S. Appl. No. 14/660,931, dated Sep. 12, 2016, having named inventors Sumit Kumar & Sumit Kapoor.

Advisory Action for U.S. Appl. No. 14/660,931, dated Dec. 6, 2016, having named inventors Sumit Kumar & Sumit Kapoor.

Marco Chiappetta, "SSDs vs. Hard Drives vs. Hybrids: Which Storage Tech Is Right for You?", Jan. 17, 2013, pp. 1-7, http://www.pcworld.com/article/2025402/ssds-vs-hard-drives-vs-hybrids-which-storage-tech-is-right-for-you-.html.

Microsoft, "Synchronous and Asynchronous I/O", Oct. 4, 2011, pp. 1-3, https://web.archive.org/web/20111004012327/http://msdn.microsoft.com/en-us/library/windows/desktop/aa365683(v=VS.85).aspx.

PC Guide, "Logical Block Addressing (LBA)", Sep. 2, 2000, pp. 1-2, https://web.archive.org/web/20000902032612/http://www.pcguide.com/ref/hdd/bios/modesLBA-c.html.

(56) References Cited

OTHER PUBLICATIONS

Webopedia, "Logical", Aug. 8, 2002, pp. 1-2, https://web.archive.org/web/20020808144457/http://www.webopedia.com/TERM/L/logical.html.
Webopedia, "API", Jun. 21, 2000, pp. 1-2, https://web.archive.org/web/20000621114956/http://www.webopedia.com/TERM/A/API.html.
Anonymous, "Javatuples", Nov. 5, 2010, pp. 1-3, https://web.archive.org/web/20101105112452/http://www.javatuples.org/.

* cited by examiner

APPARATUS AND METHOD FOR CACHE PROVISIONING, CONFIGURATION FOR OPTIMAL APPLICATION PERFORMANCE

CROSS-REFERENCE(S) TO RELATED APPLICATIONS

This application claims the benefit of and priority to U.S. Provisional Application 61/954,007, filed 17 Mar. 2014. This U.S. Provisional Application 61/954,007 is hereby fully incorporated herein by reference.

FIELD

Embodiments of the invention relate generally to data storage systems.

DESCRIPTION OF RELATED ART

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against this present disclosure.

Various caching solutions are available for data storage systems. Typically, these caching solutions lack efficiency in a very complex and/or high volume data storage environment. Additionally, these caching solutions do not provide policies that utilize the data sets of applications. Additionally, there is a continuing need for conventional systems to achieved improved performance.

While the above-noted systems are suited for their intended purpose(s), there is a continuing need for reliable data storage systems.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

An exemplary embodiment of the invention provides an apparatus and method for cache provisioning, configuration for optimal application performance.

Figure 1:
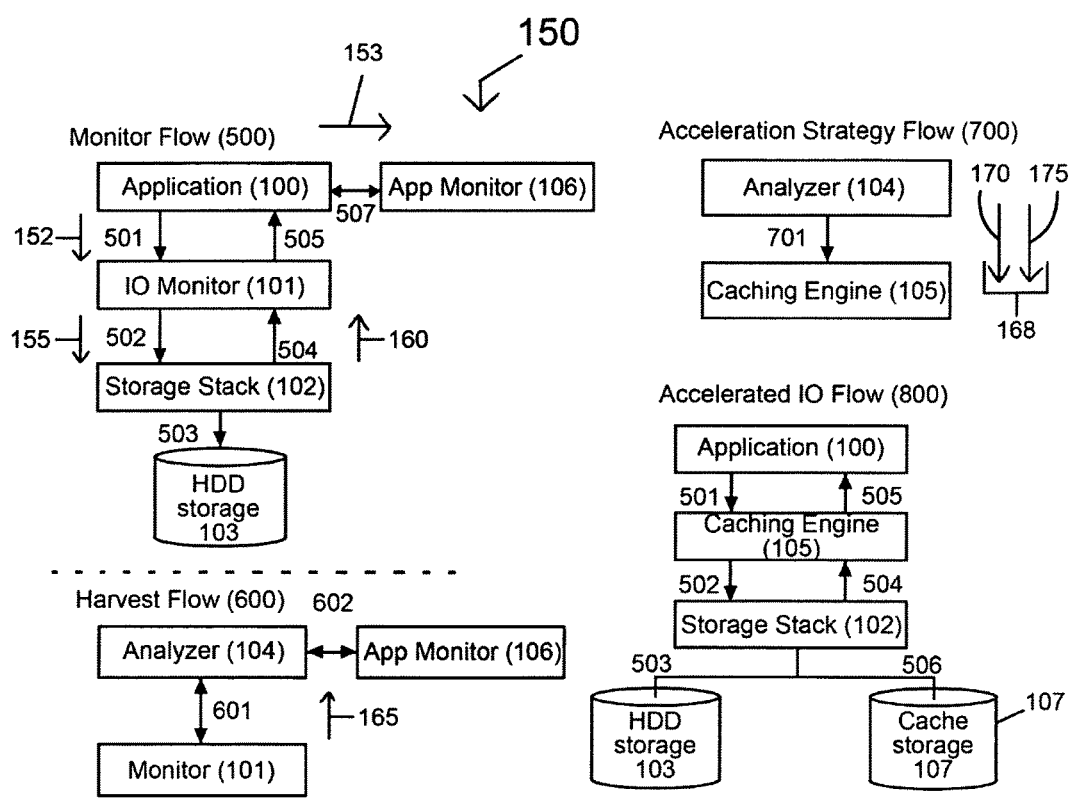
FIG. 1 is a block diagram of an apparatus in accordance with an embodiment of the invention.

FIG. 1 is a block diagram of an apparatus 150 (data storage system 150 or system 150) in accordance with an embodiment of the invention. The system 150 is configured to select (and to provide a method for selecting) caching policies to optimize cache utilization and application performance based on application IO (input/output) profiles. The system 150 is configured assist in cache sizing (and to provide the same method that is extended to assist in cache sizing). In other words, the system 150 is configured to provision (and to provide a method for provisioning) a given size of cache that achieves a certain level of performance improvement.

The overall system performance in the presence of a caching solution and a given cache capacity depend on a number of factors. For example, these factors can include one or more of the following characteristics (or nature) of the IO stream: (1) the shape of the application IO stream (the distribution of the IO stream in terms of timelines), (2) if the IO is bursty in nature or is well spread out, (3) the distribution of the IO size issued by an application, (4) if the IO stream is predominantly reads or writes, (5) if the IO stream is sequential or random, (6) sizes and rates of the IO stream, and/or (7) if the IO stream is exhibiting a locality of reference or if the IO stream is exhibiting a great amount of randomness. Such factors in (1) through (7) above are determined for each system 150, and the appropriate caching policy based on this determination is then designed and applied in system 150 for optimal performance and cache utilization. The factors (1) through (7) are known as IO-related contents.

Examples of the factors (IO-related contents) (1) through (7) of IO streams are now discussed.

Factor (1)—Shape of the IO stream: Common to many Businesses—a reporting and analytics use case involves data ingestion into the system followed by data analysis/reporting. The data ingestion is a large sequential write IO stream. This IO stream lasts for a few minutes to several hours depending on the size of the dataset to be analyzed. This IO stream is followed by a large number of small sized random accesses as a result of the "queries" that the analytics software performs. This IO stream of random accesses is followed by a large period of inactivity as new data is gathered.

Factor (2): A bursty IO stream can occur, for example, when a database index is created for the first time or when an application commits a large amount of buffered data to persistent storage. A bursty IO stream can also occur when there is a high volume of user activity which is normally absent, e.g., during a holiday sale.

Factor (3): Most applications have several pieces of information they need or work with to function. These pieces of information are, for example, indexes, logs, tables, and other information such metadata besides user data. These pieces of information also have a preferred size of issuing IO requests for each piece of information. For instance a MySQL database accesses its metadata in chunks of 4096 bytes while user data is accessed in chunks of 16 KB. However, there are several layers of storage software which may influence these IO sizes—due to merging, sorting, and/or buffering. The histogram of IO sizes indicates the exact distribution.

Factor (4): Web server is a popular application in this age of the internet. The IO stream of a Web server application is typically about 90% reads of web pages and about 10% writes of logs. A database application like Oracle Database configured for, e.g., transaction processing typically experiences about 70% reads (queries) and about 30% writes (inserts and updates).

Factor (5): Different parts of an application and different applications exhibit sequential access patterns or random access patterns. For example, the logs of a database are written sequentially while the tables and indexes of logs are accessed randomly. A webserver writes its logs sequentially.

Factor (7): An application like Twitter may have, e.g., about 10 peta bytes of data in its databases. However, it is only the most recent tweets that are accessed frequently. As a consequence, such an application may choose to store the most recent tweets together to ensure that the underlying storage system can retrieve them efficiently. Such a storage scheme is said to exhibit a "temporal locality of reference". Similarly, due to the sluggish nature of a hard disk based system, application and system software store related pieces of information like directory entries and their inodes within the same disk cylinder—this is said to exhibit a "spatial locality of reference".

In accordance with an embodiment of the invention, a three-part caching system 150 is disclosed and presented. The first part of the system 150 comprises an IO (input/output) monitor 101, second part of the system 150 comprises an IO stream analyzer 104, and the third part of the system 150 comprises a caching engine 105. The monitor 101 is deployed for a certain period of time on the system being accelerated. During this time, the monitor 101 interprets the IO stream by collecting various information as described above. Once the monitoring phase completes, the results are analyzed offline by an analyzer program (analyzer 104) which determines the optimal cache size to deliver the desired performance boost. On the other hand for a given cache size, the possible IO performance is also determined.

The monitor 101 (a) identifies the IO stream characteristics and (b) assigns meaning (information) by correlating the IO stream with application-defined objects such as, for example, database indexes. Once this analysis completes, a map of the data is constructed, where the map is indicative of the parts of the primary storage (a) exhibiting a sufficient locality of reference, and (b) contains semantically important content.

Suppose a database application performing transactions is to be optimized. Assume that the application stores its index data in disk blocks 100-1000. Suppose the application is issuing an IO stream which involves accessing blocks in the range 0-10000 in a specific permutation. All IO activity is intercepted by the monitor (101), and the monitor 101 will then keep track of the frequency of block access, which is recorded persistently for future reference. For example, the monitor 101 may record that the blocks in the range 100-1000 were accessed 10 times each in the last 1 (one) hour. Assume that during this time, the rest of the blocks were accessed only 3 times each—this is typical of a query sensitive workload found in many business use cases. Because the caching architecture has a component (106) which understands the meaning of blocks in the range 100-1000, the monitor 106 can then correlate that the index blocks have been accessed more frequently than the rest of the blocks. Once this application insight has been gained, an appropriate decision can be taken. For example, a decision would be to use 100 GB of cache, employ write back policy, and optimize all indexes—and also aggressively prefetch the index blocks so that the application performance can be further optimized.

Based on the IO stream, a decision is made in the relevant acceleration policy. In other words, a decision is made whether to accelerate in write through, write back, write around, or read only modes. The choice is made considering the determined average, peak, and low write rates for provisioning a write back cache space. Provisioning too much write back cache space would be an underutilization of the cache. The cache can only absorb as much writes as can be efficiently copied back to the primary storage.

This three-part system 150 is, for example, useful in both bare metal deployments as well as in server virtualized environments (e.g., a server running VMWare) where cache sizing/utilization is a difficult but important problem to solve.

The application 100 can be any typical application running on an Operating System such as, for example, windows, unix, linux, or other types of Operating Systems. The application 100 stores data to and retrieves data from the storage 103 which can be any form of a permanent storage device such as, for example, a hard disk based storage (e.g., hard disk drive). The storage 103 could be locally attached, SAN attached (storage area network attached), or network attached. The storage 103 is accessed via the Storage Stack 102 which is typically a set of OS drivers like disk, SCSI, iSCSI, NFS, and/or FileSystem.

The application 100 issues IO requests 152 which can either be a read or a write (501). These IO requests 152 are intended for the Storage Stack 102. The Monitor 101 records the nature of the IO requests 152 (510) and passes this recorded nature 155 unmodified (502). The Storage Stack 102 forwards the recorded nature 155 to the actual storage component 103 (503). The nature 155 were similarly described above. Therefore, the Monitor 101 records the heuristics of the IO requests 152 to determine which of the IO requests are important.

When the IO request 152 is completed, the notification 160 is intercepted (504) by the monitor 101. Similar monitoring (507) of application-level heuristics 153 is performed at the application level by the application monitor 106. This application monitor 106 discovers various components of the application 100 (components such as, e.g., databases, indexes, collections, tables, etc.) which can be accelerated and determines using application specific strategies components which are frequently accessed and components that are key to application performance (e.g., indexes). These discovered components are semantically-relevant contents. The application monitor 106 determines the layout of such components on the primary storage 103. The application monitor 106 builds further statistics about the underlying storage subsystem and the application on top. This flow (500) continues for a well-defined period of time (monitor phase) which can be, for example, approximately 24 hours. An application monitor 106 is highly specific for each application 100 type.

As an example, if an application 100 issues IOs 152, the monitor 101 records the IO-level heuristics 155, while the application monitor 106 records the application-level heuristics 153, and the analyzer 104 monitors and correlates the IO-level heuristics 155 and application-level heuristics 153.

The acceleration strategy flow 700 is now described. The Analyzer 104 periodically harvests the raw statistics 165 from the monitor 101 (601), where the raw statistics 165 includes the recorded IO-level heuristics 155 and also harvest the application-level heuristics 153 from the application monitor 106 (602). Based on the IO-level heuristics 155 and application-level heuristics 153, the analyzer 104 then determines the best parameters for the cache unit size, cache capacity, read cache size, write cache size, the regions of the primary storage 103 which are most important and regions which exhibit a good locality of reference, and these types of regions are candidates for cache acceleration. The Analyzer 104 predicts the optimal application performance based on the above settings and recommends (sends) cache provisioning hints 170 and an acceleration strategy 175 to the caching engine 105 (701). For example, the analyzer 104 can determine and/or correlate (based on the statistics in the IO-level heuristics 155 and application-level heuristics 153) the regions of the storage 103 that are highly accessed, the shapes of the IOs, the frequency of the need to perform a copyback since copybacks determine system performance in order to determine a policy 168 which includes cache provisioning hints 170 and an acceleration strategy 175. For example, a policy 168 determines that for a given block size, the particular regions of the storage 103 have to be accelerated because they are indexes, and/or a given amount of cache space has to be provisioned for a given amount (e.g., 20%) of the application data set which is accessed at a given amount (e.g., 80%) of time, and/or a given amount of cached space has to be provisioned for accelerating writes, and/or the rate to be set for a writeback and/or copyback since the rate of a copyback has to be set so as to prevent consumption of most of the cache space. Accordingly, the analyzer 104 correlates and analyzes the application-level heuristics 153 and IO-level heuristics 155 so that the analyzer 104 generates a policy 168.

Another example of an acceleration policy 168 is now discussed. For an analytics workload, a policy 168 (e.g., write back acceleration policy 168) which accelerates every write would result in near SSD performance. The write back policy is chosen in response to understanding the workload characteristics—the spread and shape of the IO along with the sequential write followed by random reads. The key here is that while it is a write back policy, it should be noted that every write is optimized.

For a transaction processing workload, a write back policy is employed, but not every write is optimized. Upon monitoring and determining the available cache space, only select writes are optimized to ensure that the cache does not "thrash". Thrashing of the cache is a condition where frequently blocks are placed and removed from the cache resulting in sub optimal performance.

Any important application IO 501 is service by the caching engine 105 and routed (506) to a high performance cache storage 107. In one embodiment of the invention, the cache storage 107 is at least one solid state device (SSD). Unimportant application IOs (or less important application IOs) are routed (503) to the primary storage 103. The less important IOS are stored in queue and are scheduled for processing in a sequential manner so to maximize the disk bandwidth during communications.

As an example, in a database transaction processing system, index IO and certain parts of table data are very important portions of system data and are cached. Therefore, these very important portions of system data are routed (506) to the cache 107. The rest of the system data like undo log, redo log, secondary tables are routed (503) to the primary storage 103.

As another example, in a web server application, depending on the activity, some of the website pages are important and are cached. Therefore, these website pages that are important are routed (506) to the cache 107. The rest of the website data (pages) and website logs are not important and are passed on and routed (503) to the primary storage 103.

In an embodiment of the invention, the above components 101, 104, and 106, the caching engine 105 is able to make a sound decision on what and how much to cache for optimal system performance with minimal cache storage 107.

Figure 2:
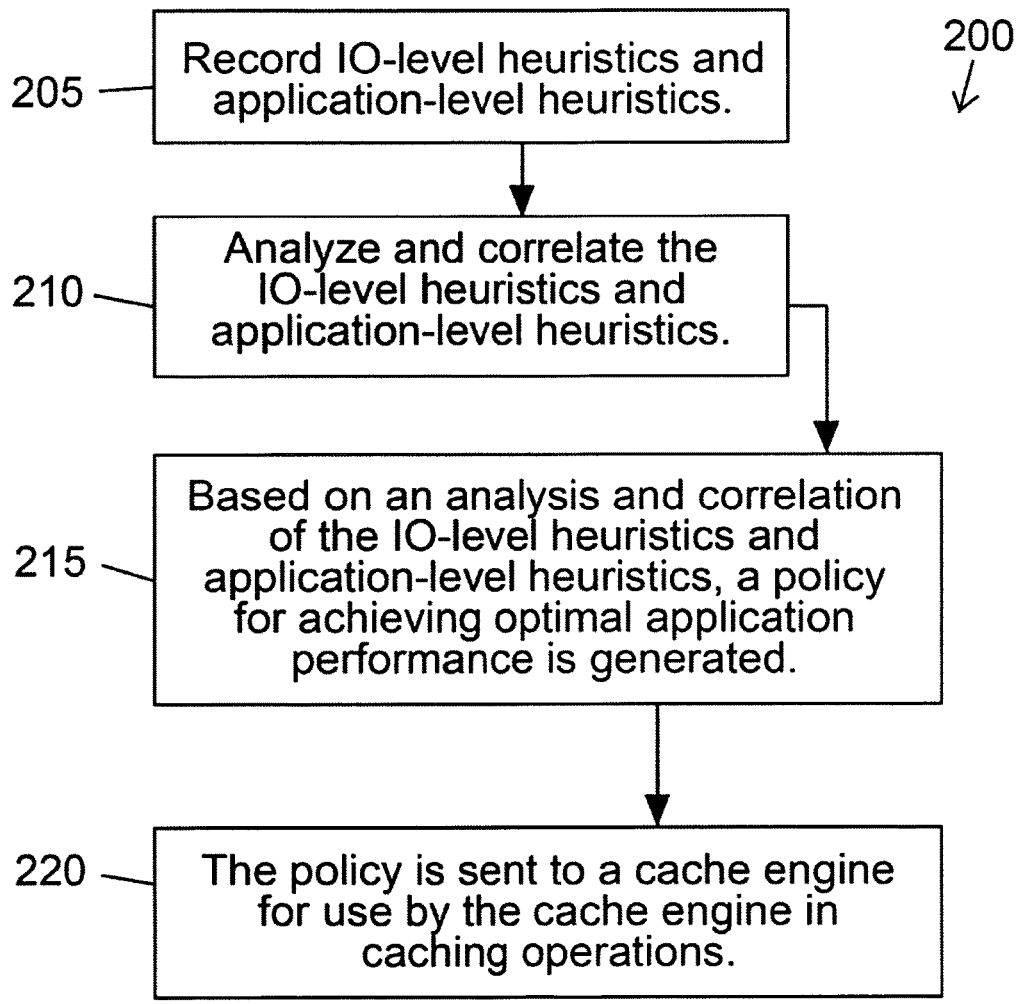
FIG. 2 is a flowchart of a method in accordance with an embodiment of the invention.

FIG. 2 is a flowchart of a method 200 in accordance with an embodiment of the invention. At 205, application-level heuristics and IO-level heuristics are recorded.

At 210, the application-level heuristics and IO-level heuristics are correlated and analyzed.

At 215, based on an analysis and correlation of the application-level heuristics and IO-level heuristics, a policy 168 for achieving optimal application performance is generated by the analyzer 104.

At 220, the policy 168 is sent to a cache engine 105 for use by the cache engine 105 in caching operations.

Accordingly, an embodiment of the invention provides a method comprising: recording application-level heuristics and IO-level (input/output-level) heuristics; correlating and analyzing the application-level heuristics and IO-level heuristics; and based on an analysis and correlation of the application-level heuristics and IO-level heuristics, generating a policy for achieving optimal application performance.

In another embodiment of the invention, the method further comprises: sending the policy to a cache engine for use by the cache engine in caching operations.

In yet another embodiment of the invention, an apparatus comprises: a system configured to record application-level heuristics and IO-level (input/output-level) heuristics, to correlate and analyze the application-level heuristics and IO-level heuristics, and based on an analysis and correlation of the application-level heuristics and IO-level heuristics, to generate a policy for achieving optimal application performance.

In yet another embodiment of the invention, the apparatus comprises the system that is further configured to send the policy to a cache engine for use by the cache engine in caching operations.

In yet another embodiment of the invention, an article of manufacture comprises: a non-transient computer-readable medium having stored thereon instructions that permit a method comprising: recording application-level heuristics and IO-level (input/output-level) heuristics; correlating and analyzing the application-level heuristics and IO-level heuristics; and based on an analysis and correlation of the application-level heuristics and IO-level heuristics, generating a policy for achieving optimal application performance.

In yet another embodiment of the invention, the article of manufacture includes instructions that permit the method further comprising: sending the policy to a cache engine for use by the cache engine in caching operations.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    recording, by an application monitor, application-level heuristics;
    wherein the application-level heuristics are monitored and recorded at an application level by the application monitor;
    recording, by an IO (input/output) monitor, IO-level (input/output-level) heuristics in IO requests and subsequently passing, by the IO monitor, the IO-level heuristics to a storage stack;
    wherein the IO monitor identifies IO stream characteristics in the IO requests and correlates the IO stream characteristics with application-defined objects;
    wherein the application-level heuristics indicate a first plurality of components that can be accelerated in an application, a second plurality of components that are frequently accessed in the application, and a third plurality of components that are key to an application performance of the application;
    wherein the IO-level heuristics indicate the IO stream characteristics and indicate a nature of the IO requests;
    wherein the IO stream characteristics include a size of a dataset in an IO stream having the IO stream characteristics, an access pattern exhibiting if the IO stream comprises a sequential access pattern or a random access pattern, and whether the IO stream is predominantly reads or predominantly writes;
    wherein the application-level heuristics indicate which components of the application can be accelerated, which components of the application are frequently accessed, and which components of the application are key to application performance;
    correlating and analyzing, by an analyzer, the application-level heuristics and IO-level heuristics;
    based on and in response to an analysis and a correlation of statistics in the application-level heuristics and in the IO-level heuristics, generating, by the analyzer, a caching policy, including parameters related to a cache and a primary storage coupled to the cache, for achieving optimal application performance;
    based on the analysis and the correlation of the statistics in the application-level heuristics and in the IO-level heuristics, generating and provisioning a cache configuration for achieving optimal application performance including selecting settings for cache unit size, cache capacity, read cache size, write cache size, and regions of the primary storage that are candidates for cache acceleration;
    wherein the caching policy comprises cache provisioning hints and an acceleration strategy; and
    using, by a caching engine, the caching policy during caching operations on the cache in order to optimize a utilization of the cache and optimize a performance of the application.

2. The method of claim 1, further comprising:
    sending the caching policy to the caching engine for use by the caching engine in caching operations.

3. The method of claim 1, further comprising:
    provisioning, by the caching engine, the cache based on the caching policy so that a given size of the cache achieves a certain level of performance improvement.

4. The method of claim 1, wherein the caching policy determines for a given block size at least one or more of the following: particular regions in the primary storage that are accelerated; amounts, in the cache, of cache spaces that are provisioned for a data set of the application and/or that are provisioned for accelerating writes; rates for a writeback and a copyback; and/or a writeback acceleration policy.

5. The method of claim 1, wherein the cache is explicitly configured to be in effect and is different from any other kind of existing caching mechanism in a system.

6. The method of claim 5, wherein the cache is different from a hardware cache such as a central processing unit (CPU) cache and other pre-existing caches in the system.

7. The method of claim 5, wherein the cache is not configured such as a X86 server system with direct attached flash resources which are capable of being used as a cache storage.

8. The method of claim 5, wherein the system does not have the cache but the system can benefit from having cache resources.

9. An apparatus, comprising:
a system comprising an application monitor, an IO (input/output) monitor, an analyzer, and a caching engine;
wherein the application monitor is configured to record application-level heuristics;
wherein the application-level heuristics are monitored and recorded at an application level by the application monitor;
wherein the IO monitor is configured to record IO-level (input/output-level) heuristics in IO requests and is configured to subsequently pass the IO-level heuristics to a storage stack;
wherein the IO monitor identifies IO stream characteristics in the IO requests and correlates the IO stream characteristics with application-defined objects;
wherein the analyzer is configured to correlate and analyze statistics in the application-level heuristics and in the IO-level heuristics and to generate a caching policy, including parameters related to a cache and a primary storage coupled to the cache, for achieving optimal application performance based on and in response to an analysis and a correlation of the application-level heuristics and IO-level heuristics,
wherein based on the analysis and the correlation of the statistics in the application-level heuristics and in the IO-level heuristics, the analyzer generates and provisions a cache configuration for achieving optimal application performance including selecting settings for cache unit size, cache capacity, read cache size, write cache size, and regions of the primary storage that are candidates for cache acceleration, and
wherein the caching engine is configured to use the caching policy during caching operations on the cache in order to optimize a utilization of the cache and optimize a performance of an application;
wherein the application-level heuristics indicate a first plurality of components that can be accelerated in an the application, a second plurality of components that are frequently accessed in the application, and a third plurality of components that are key to an application performance of the application;
wherein the IO-level heuristics indicate the IO stream characteristics and indicate a nature of the IO requests;
wherein the IO stream characteristics include a size of a dataset in an IO stream having the IO stream characteristics, an access pattern exhibiting if the IO stream comprises a sequential access pattern or a random access pattern, and whether the IO stream is predominantly reads or predominantly writes;
wherein the application-level heuristics indicate which components of the application can be accelerated, which components of the application are frequently accessed, and which components of the application are key to application performance; and
wherein the caching policy comprises cache provisioning hints and an acceleration strategy.

10. The apparatus of claim 9, wherein the system is further configured to send the caching policy to the caching engine for use by the caching engine in caching operations.

11. The apparatus of claim 9, wherein the caching engine provisions the cache based on the caching policy so that a given size of the cache achieves a certain level of performance improvement.

12. The apparatus of claim 9, wherein the caching policy determines for a given block size at least one or more of the following: particular regions in the primary storage that are accelerated; amounts, in the cache, of cache spaces that are provisioned for a data set of the application and/or that are provisioned for accelerating writes; rates for a writeback and a copyback; and/or a writeback acceleration policy.

13. The apparatus of claim 9, wherein the cache is explicitly configured to be in effect and is different from any other kind of existing caching mechanism in a system.

14. The apparatus of claim 13, wherein the cache is different from a hardware cache such as a central processing unit (CPU) cache and other pre-existing caches in the system.

15. The apparatus of claim 13, wherein the cache is not configured such as a X86 server system with direct attached flash resources which are capable of being used as a cache storage.

16. The apparatus of claim 13, wherein the system does not have the cache but the system can benefit from having cache resources.

17. An article of manufacture, comprising:
a non-transitory computer-readable medium having stored thereon instructions operable to permit an apparatus to perform a method comprising:
recording, by an application monitor, application-level heuristics;
wherein the application-level heuristics are monitored and recorded at an application level by the application monitor;
recording, by an IO (input/output) monitor, IO-level (input/output-level) heuristics in IO requests and subsequently passing, by the IO monitor, the IO-level heuristics to a storage stack;
wherein the IO monitor identifies IO stream characteristics in the IO requests and correlates the IO stream characteristics with application-defined objects;
wherein the application-level heuristics indicate a first plurality of components that can be accelerated in an application, a second plurality of components that are frequently accessed in the application, and a third plurality of components that are key to an application performance of the application;
wherein the IO-level heuristics indicate the IO stream characteristics and indicate a nature of the IO requests;
wherein the IO stream characteristics include a size of a dataset in an IO stream having the IO stream characteristics, an access pattern exhibiting if the IO stream comprises a sequential access pattern or a random access pattern, and whether the IO stream is predominantly reads or predominantly writes;
wherein the application-level heuristics indicate which components of the application can be accelerated, which components of the application are frequently accessed, and which components of the application are key to application performance;
correlating and analyzing, by an analyzer, the application-level heuristics and IO-level heuristics; and
based on and in response to an analysis and a correlation of statistics in the application-level heuristics and in the IO-level heuristics, generating, by an analyzer, a caching policy, including parameters related to a cache and a primary storage coupled to the cache, for achieving optimal application performance;

based on the analysis and the correlation of the statistics in the application-level heuristics and in the IO-level heuristics, generating and provisioning a cache configuration for achieving optimal application performance including selecting settings for cache unit size, cache capacity, read cache size, write cache size, and regions of the primary storage that are candidates for cache acceleration;

wherein the caching policy comprises cache provisioning hints and an acceleration strategy; and using, by a caching engine, the caching policy during caching operations on the cache in order to optimize a utilization of the cache and optimize a performance of the application.

18. The article of manufacture of claim 17, wherein the instructions are further operable to permit the apparatus to perform a method further comprising:

sending the caching policy to the caching engine for use by the caching engine in caching operations.

19. The article of manufacture of claim 17, wherein the instructions further permit the apparatus to perform a method further comprising:

provisioning, by the caching engine, the cache based on the caching policy so that a given size of the cache achieves a certain level of performance improvement.

20. The article of manufacture of claim 17, wherein the caching policy determines for a given block size at least one or more of the following:

particular regions in the primary storage that are accelerated; amounts, in the cache, of cache spaces that are provisioned for a data set of the application and/or that are provisioned for accelerating writes; rates for a writeback and a copyback; and/or a writeback acceleration policy.

* * * * *